(12) United States Patent
Komuro

(10) Patent No.: US 11,866,071 B2
(45) Date of Patent: Jan. 9, 2024

(54) PREDICTING DEVICE, VEHICLE SYSTEM, AND STORAGE MEDIUM

(71) Applicant: HONDA MOTOR CO., LTD., Tokyo (JP)

(72) Inventor: Misa Komuro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 17/068,847

(22) Filed: Oct. 13, 2020

(65) Prior Publication Data

US 2021/0114629 A1 Apr. 22, 2021

(30) Foreign Application Priority Data

Oct. 18, 2019 (JP) ................................ 2019-191022

(51) Int. Cl.
| | |
|---|---|
| *B60W 60/00* | (2020.01) |
| *B60W 30/095* | (2012.01) |
| *B60W 30/09* | (2012.01) |
| *B60W 50/00* | (2006.01) |
| *B60W 40/04* | (2006.01) |
| *G06V 20/58* | (2022.01) |

(52) U.S. Cl.
CPC ...... *B60W 60/00274* (2020.02); *B60W 30/09* (2013.01); *B60W 30/0956* (2013.01); *B60W 40/04* (2013.01); *B60W 50/0097* (2013.01); *G06V 20/58* (2022.01); *B60W 2554/4041* (2020.02); *B60W 2554/4045* (2020.02); *B60W 2556/10* (2020.02)

(58) Field of Classification Search
None
See application file for complete search history.

(56) References Cited

U.S. PATENT DOCUMENTS

| | | | | |
|---|---|---|---|---|
| 8,538,902 | B2 * | 9/2013 | Taguchi | G08G 1/167 706/46 |
| 11,099,564 | B2 * | 8/2021 | Tsuchiya | B60W 60/0011 |

(Continued)

FOREIGN PATENT DOCUMENTS

| | | |
|---|---|---|
| JP | 2002-074594 | 3/2002 |
| JP | 4349452 | 10/2009 |

(Continued)

OTHER PUBLICATIONS

Japanese Office Action for Japanese Patent Application No. 2019-191022 dated Nov. 15, 2022.

*Primary Examiner* — Isaac G Smith
*Assistant Examiner* — Jennifer M Anda
(74) *Attorney, Agent, or Firm* — Amin, Turocy & Watson, LLP

(57) ABSTRACT

A predicting device includes: a recognizer configured to recognize a state of a moving body; a predictor configured to predict a position of the moving body in the future on the basis of the recognition result of the recognizer; and a processor configured to determine whether to set a first risk region or a second risk region larger than the first risk region for the moving body on the deviation between a position of the moving body which has been recognized by the recognizer and a position of the moving body in the future which has been predicted previously by the predictor.

15 Claims, 16 Drawing Sheets

(56) References Cited

U.S. PATENT DOCUMENTS

| | | | | |
|---|---|---|---|---|
| 2010/0242877 | A1* | 9/2010 | Shiomi | F02D 41/18 |
| | | | | 123/90.15 |
| 2017/0039865 | A1* | 2/2017 | Takabayashi | G08G 1/166 |
| 2017/0057497 | A1* | 3/2017 | Laur | B60W 40/02 |
| 2017/0217432 | A1* | 8/2017 | Minemura | B60W 30/09 |
| 2018/0032040 | A1* | 2/2018 | Sweet, III | G05D 1/102 |
| 2020/0023842 | A1* | 1/2020 | Gutierrez | B60W 50/14 |
| 2022/0315047 | A1* | 10/2022 | Probst | B60W 30/16 |

FOREIGN PATENT DOCUMENTS

| | | |
|---|---|---|
| JP | 2017-142760 | 8/2017 |
| JP | 2018-124663 | 8/2018 |
| JP | 2019-078554 | 5/2019 |
| WO | 2010/038851 | 4/2010 |

\* cited by examiner

FIG. 10

| | PROCESSOR | T | T+1 | T+2 | T+3 | T+4 |
|---|---|---|---|---|---|---|
| NO CHANGE IN SAMPLING RATE | RECOGNIZER | ○ | ○ | ○ | ○ | ○ |
| | PREDICTOR | ○ | | ○ | | ○ |
| THERE IS CHANGE IN SAMPLING RATE | RECOGNIZER | ○ | ○ | ○ | ○ | ○ |
| | PREDICTOR | ○ | ○ | ○ | ○ | ○ |

○ EXECUTION OF PROCESS

PREDICTING DEVICE, VEHICLE SYSTEM, AND STORAGE MEDIUM

CROSS-REFERENCE TO RELATED APPLICATION

Priority is claimed on Japanese Patent Application No. 2019-191022, filed Oct. 18, 2019, the content of which is incorporated herein by reference.

BACKGROUND

Field of the Invention

The present invention relates to a predicting device, a vehicle system, and a storage medium.

Description of Related Art

In recent years, research has proceeded with regard to automatic control of a vehicle. In the related art, a predicting device which predicts the position of a moving object around a subject vehicle in the future has been described (Japanese Unexamined Patent Application, First Publication No. 2018-124663, Japanese Unexamined Patent Application, First Publication No. 2002-74594, and Japanese Patent No. 4349452). This predicting device includes a first predictor which makes a simple prediction of a position of moving objects in the future, a second predictor which performs main prediction of the position of a moving object in the future with higher accuracy than that of the first predictor, and an assigner which assigns a moving object for a main prediction of the position in the future by the second predictor in accordance with the results of the simple prediction.

However, the above-described predicting device may not be able to accurately derive the risks from moving bodies in the future.

SUMMARY

The present invention was made in consideration of such circumstances, and an object of the present invention is to provide a predicting device, a vehicle system, and a storage medium in which a risk of a moving body in the future can be derived with higher accuracy.

A predicting device, a vehicle system, and a storage medium according to the present invention have the following constitutions.

(1): A predicting device according to an aspect of the present invention includes: a recognizer which is configured to recognize a state of a moving body; a predictor which is configured to predict a position of the moving body in the future on the basis of the recognition result of the recognizer; and a processor which is configured to determine whether to set a first risk region or a second risk region larger than the first risk region for the moving body on the basis of the deviation between a position of the moving body which has been recognized by the recognizer and a position of the moving body in the future which has been predicted previously by the predictor.

(2): In the aspect of (1), the processor is configured to set the first risk region or the second risk region for one or both of a position of the moving body in the present and a position of the moving body in the future.

(3): In the aspect of (1) or (2), the processor is configured to set the first risk region for the moving body when the deviation between a first position of the moving body at a second time which has been recognized by the recognizer and a second position of the moving body at the second time which has been predicted by the predictor at a first time before the second time is less than a first predetermined degree, and set the second risk region for the moving body when the deviation between the first position of the moving body at the second time which has been recognized by the recognizer and the second position of the moving body at the second time which has been predicted by the predictor at the first time before the second time is the first predetermined degree or more.

(4): In the aspect of (3), the processor is configured to set the first risk region for the moving body when the second risk region is set and then the deviation between the first position and the second position is less than a second predetermined degree.

(5): In the aspect of (4), the second predetermined degree is a degree smaller than the first predetermined degree.

(6): In any of the aspects of (2) to (5), the processor is configured to set the second risk region for a moving body in which the deviation between a first position of the moving body at a second time which has been recognized by the recognizer and a second position of the moving body at the second time which has been predicted by the predictor at a first time before the second time is a first predetermined degree or more and which is present in a predetermined range from a reference position.

(7): In any of the aspects of (1) to (6), at least one of the recognizer and the predictor is configured to change a processing cycle on the basis of the deviation between a position of a moving body which has been recognized by the recognizer and a position of the moving body in the future which has been predicted previously by the predictor.

(8): In the aspect of (7), at least one of the recognizer and the predictor is configured to not change the processing cycle when the deviation between a first position of the moving body at a second time which has been recognized by the recognizer and a second position of the moving body at the second time which has been predicted by the predictor at a first time before the second time is less than a first predetermined degree, and change the processing cycle when the deviation between the first position of the moving body at the second time which has been recognized by the recognizer and the second position of the moving body at the second time which has been predicted by the predictor at the first time before the second time is the first predetermined degree or more.

(9): In the aspect of (8), at least one of the recognizer and the predictor is configured to change the processing cycle to a cycle before the change when the processing cycle is changed and then the deviation between the first position and the second position is less than a third predetermined degree.

(10): In the aspect of (9), the third predetermined degree is a degree smaller than the first predetermined degree.

(11): In any of the aspects of (8) to (10), at least one of the recognizer and the predictor is configured to change a processing cycle in which the moving body is set as a target when the deviation between a first position of the moving body at a second time which has been recognized by the recognizer and a second position of the moving body at the second time which has been predicted by the predictor at a first time before the second time is a first predetermined degree or more and the moving body is present in a predetermined range from a reference position.

(12): A predicting device according to an aspect of the present invention includes: a recognizer which is configured to recognize a state of a moving body; a predictor which is configured to predict a position of the moving body in the future on the basis of the recognition result of the recognizer; and a processor which is configured to set a risk region for the moving body, wherein at least one of the recognizer and the predictor is configured to change a processing cycle on the basis of the deviation between a position of the moving body which has been recognized by the recognizer and a position of the moving body in the future which has been predicted previously by the predictor.

(13): A vehicle system according to an aspect of the present invention includes: the predicting device according to any one of the aspects of (1) to (12); and a control device configured to control at least one of a speed and steering of a vehicle on the basis of a first risk region or a second risk region which has been set by the processor.

(14): A storage medium in which a program is stored according to an aspect of the present invention causes a computer: to recognize a state of a moving body; to predict a position of the moving body in the future on the basis of the recognition result; and to determine whether to set a first risk region or a second risk region larger than the first risk region for the moving body on the basis of the deviation between the recognized position of the moving body and a position of the moving body in the future which has been predicted previously.

(15): A predicting method according to an aspect of the present invention includes, by a computer: recognizing a state of a moving body; predicting a position of the moving body in the future on the basis of the recognition result; and determining whether to set a first risk region or a second risk region larger than the first risk region for the moving body on the basis of the deviation between the recognized position of the moving body and a position of the moving body in the future which has been predicted previously.

According to (1) to (15), the predicting device can derive a risk of the moving body in the future with higher accuracy by setting the first risk region or the second risk region on the basis of the deviation between the position of the moving body recognized by the recognizer and the position of the moving body in the future which has been predicted previously by the predictor. Particularly, the predicting device can derive a risk of the moving body in the future which moves in an unexpected manner with high accuracy.

According to (4), the predicting device can set a more appropriately risk for the moving body by setting the first risk region when the second risk region is set and then the deviation between the first position and the second position is less than the second predetermined degree.

According to (5), since the second predetermined degree is smaller than the first predetermined degree, hunting is minimized.

According to (6), the processor can derive a risk of the moving body in the future with higher accuracy while reducing a processing load by setting the second risk region for the moving body present within the predetermined range from the reference position.

According to (7), in the predicting device, at least one of the recognizer and the predictor can more quickly bring the position of the moving body based on the prediction result closer to the position of the moving body based on the recognition result of the recognizer by changing the processing cycle on the basis of the deviation between the position of the moving body recognized by the recognizer and the position of the moving body in the future which has been predicted previously by the predictor.

According to (9), the predicting device can reduce a processing load of the device by changing the processing cycle to the cycle before the change when the processing cycle is changed and then the deviation between the first position and the second position is less than the third predetermined degree.

According to (10), since the third predetermined degree is smaller than the first predetermined degree, hunting is minimized.

According to (11), the processor can more quickly bring the position of the moving body based on the prediction result closer to the position of the moving body based on the recognition result of the recognizer while reducing a processing load by changing the processing cycle in which the moving body is used as a target when the moving body is present within the predetermined range from the reference position.

According to (12), at least one of the recognizer and the predictor can more quickly bring the position of the moving body based on the prediction result closer to the position of the moving body based on the recognition result of the recognizer while reducing a processing load by changing the processing cycle on the basis of the deviation between the position of the moving body recognized by the recognizer and the position of the moving body in the future which has been predicted previously by the predictor.

According to (13), the vehicle can travel in accordance with the characteristics of the moving body compared with the related art.

BRIEF DESCRIPTION OF THE DRAWINGS

FIG. 10 is a diagram showing an increase in sampling rate.

DETAILED DESCRIPTION

Embodiments of a vehicle control device, and a storage medium of the present invention will be described below with reference to the drawings. A case in which the left-hand traffic regulation is to be applied will be described in the following description. However, when the right-hand traffic regulation is to be applied, the terms "left and right" need to be reversed. As used throughout this disclosure, the singular forms "a," "an," and "the" include plural reference unless the context clearly dictates otherwise.

[Overall Constitution]

Figure 1:
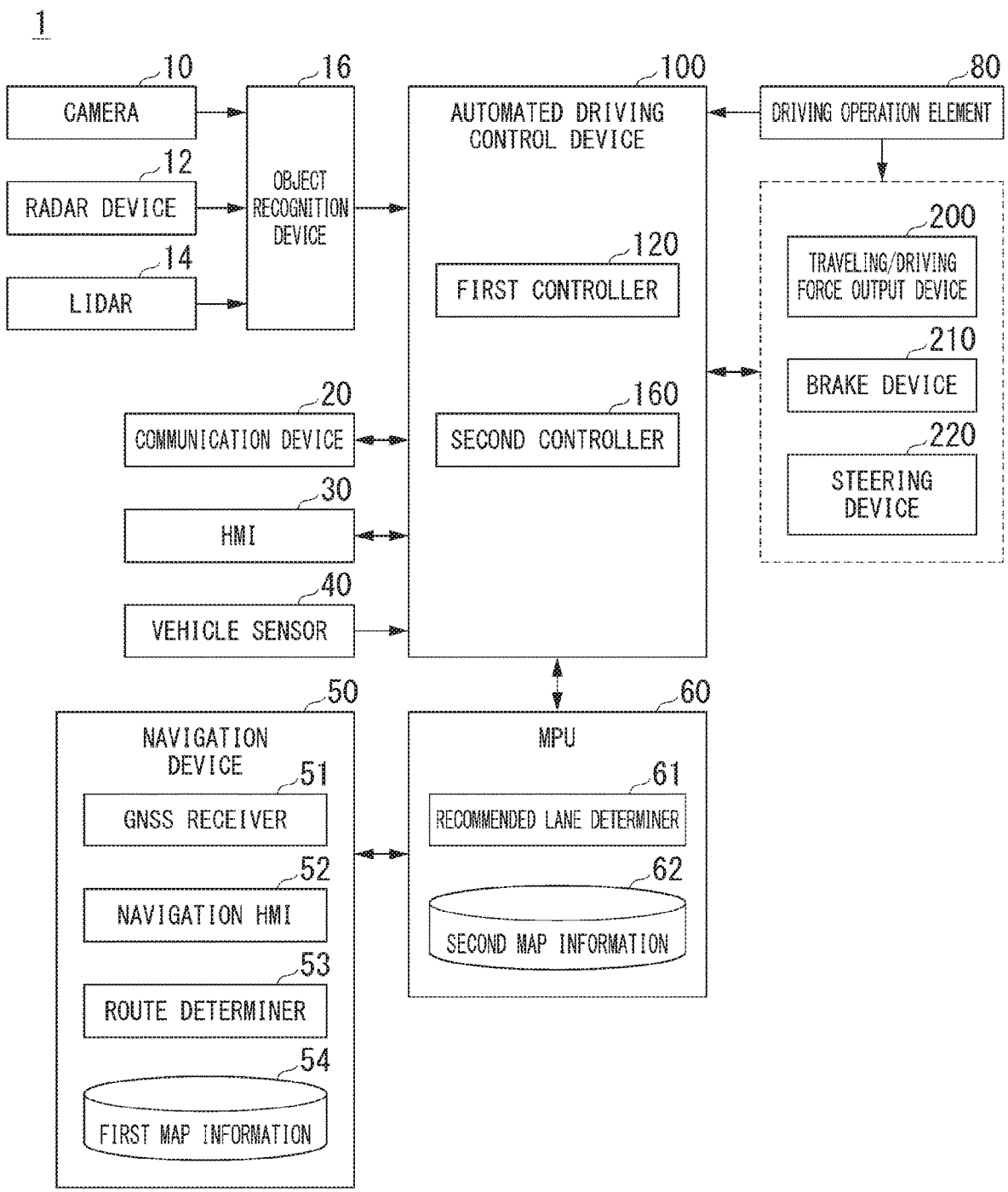
FIG. 1 is a constitution diagram of a vehicle system in which a vehicle control device is used according to an embodiment.

FIG. 1 is a constitution diagram of a vehicle system 1 in which a vehicle control device is used according to an embodiment. A vehicle in which the vehicle system 1 is installed is, for example, a vehicle such as two-wheeled vehicle, a three-wheeled vehicle, and four-wheeled vehicle. In addition, a drive source thereof includes internal combustion engines such as diesel engines and gasoline engines, electric motors, and combinations thereof. The electric motors operate using electric power generated by electric generators joined to the internal combustion engines or electric power discharged from secondary batteries or fuel cells.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operation element 80, an automated driving control device 100, a traveling/driving force output device 200, a brake device 210, and a steering device 220. These devices and apparatuses are connected to each other through multiplex communication lines such as controller area network (CAN) communication lines, serial communication lines, or wireless communication networks. The constitution illustrated in FIG. 1 is merely an example and a part of the constitution may be omitted or another constitution may be added.

The camera 10 is, for example, a digital camera in which a solid-state imaging device such as a charge coupled device (CCD) and a complementary metal oxide semiconductor (CMOS) is utilized. The camera 10 is attached to an arbitrary location of a vehicle in which the vehicle system 1 is installed (hereinafter referred to as a "subject vehicle M"). When capturing a scene in front of the vehicle, the camera 10 is attached to an upper portion of a front windshield, a rear surface of a rearview mirror, or the like. The camera 10, for example, periodically and repeatedly captures an image of the surroundings of the subject vehicle M. The camera 10 may be a stereo camera.

The radar device 12 irradiates the surroundings of the subject vehicle M with radio waves such as millimeter waves, detects radio waves reflected by an object (reflected waves), and detects at least a position (a distance and a direction) of the object. The radar device 12 is attached to an arbitrary location of the subject vehicle M. The radar device 12 may detect a position and a speed of the object through a frequency modulated continuous wave (FM-CW) method.

The LIDAR 14 irradiates the surroundings of the subject vehicle M with light (or electromagnetic waves having a wavelength close to that of light) and measures scattered light. The LIDAR 14 detects a distance to a target on the basis of a time from light emission to light reception. Light to be radiated is, for example, pulsed laser light. The LIDAR 14 is attached to an arbitrary location of the subject vehicle M.

The object recognition device 16 performs sensor fusion processing on the detection results obtained by a part or all of the camera 10, the radar device 12, and the LIDAR 14 and recognizes a position, a type, a speed, or the like of an object. The object recognition device 16 outputs the recognition result to the automated driving control device 100. The object recognition device 16 may directly output the detection results of the camera 10, the radar device 12, and the LIDAR 14 to the automated driving control device 100. The object recognition device 16 may be omitted from the vehicle system 1.

The communication device 20 communicates with other vehicles present around the subject vehicle M or communicates with various server devices via a wireless base station using, for example, a cellular network, a Wi-Fi network, Bluetooth (registered trademark), a dedicated short range communication (DSRC), or the like.

The HMI 30 presents various information to an occupant of the subject vehicle M and receives an input operation by the occupant. The HMI 30 includes various display devices, speakers, buzzers, touch panels, switches, keys, and the like.

The vehicle sensor 40 includes a vehicle speed sensor which detects a speed of the subject vehicle M, an acceleration sensor which detects an acceleration, a yaw rate sensor which detects an angular speed around a vertical axis, a direction sensor which detects a direction of the subject vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) and a flash memory. The GNSS receiver 51 specifies a position of the subject vehicle M on the basis of signals received from GNSS satellites. The position of the subject vehicle M may be specified or supplemented using an inertial navigation system (INS) in which an output of the vehicle sensor 40 is used. The navigation HMI 52 includes a display device, a speaker, a touch panel, a key, and the like. The navigation HMI 52 may be partly or wholly shared with the HMI 30 described above. For example, the route determiner 53 determines a route to a destination which has been input by the occupant (hereinafter referred to as a "route on a map") using the navigation HMI 52 from a position of the subject vehicle M specified through the GNSS receiver 51 (or an arbitrary input position) with reference to the first map information 54. The first map information 54 is, for example, information in which a road shape is expressed by a link indicating a road and nodes connected by the link. The first map information 54 may include a curvature of a road, point of interest (POI) information, and the like. The road on a map is output to the MPU 60. The navigation device 50 may perform a route guidance using the navigation HMI 52 on the basis of the route on a map. The navigation device 50 may be implemented through, for example, a function of a terminal device such as a smartphone or a tablet terminal owned by the occupant. The navigation device 50 may transmit a current position and a destination to a navigation server via the communication device 20 and acquire a route which is equivalent to the route on a map from the navigation server.

The MPU 60 includes, for example, a recommended lane determiner 61 and holds second map information 62 in a storage device such as an HDD and a flash memory. The recommended lane determiner 61 divides the route on a map provided from the navigation device 50 into a plurality of blocks (for example, performs division every 100 [m] in a vehicle traveling direction) and determines a recommended lane for each block with reference to the second map information 62. The recommended lane determiner 61 performs determination concerning the details of a lane in which the vehicle is traveling from the leftmost lane. The recommended lane determiner 61 determines a recommended lane so that the subject vehicle M can travel on a reasonable route for traveling to a branch destination when a branch location is present on the route on a map.

The second map information 62 is more accurate map information than the first map information 54. The second map information 62 includes, for example, information regarding a center of a lane or information regarding a boundary of a lane. The second map information 62 may include road information, traffic regulation information, address information (address/postal code), facility information, telephone number information, and the like. The second map information 62 may be updated at any time using the communication device 20 communicating with another device.

The driving operation element 80 includes, for example, an accelerator pedal, a brake pedal, a shift lever, a steering wheel, a modified steer, a joystick, and other operator elements. A sensor which detects an amount of operation or the presence or absence of an operation is attached to the driving operation element 80. In addition, the detection results are output to the automated driving control device 100 or a part or all of the traveling/driving force output device 200, the brake device 210, and the steering device 220.

The automated driving control device 100 includes, for example, a first controller 120 and a second controller 160. Each of the first controller 120 and the second controller 160 is realized using, for example, a hardware processor such as a central processor (CPU) configured to execute a program (software). Some or all of these constituent elements may be implemented using hardware (a circuit section; including a circuitry) such as a large scale integration (LSI), an application specific integrated circuit (ASIC), a field-programmable gate array (FPGA), and a graphics processing unit (GPU) or may be realized in cooperation of software and hardware. A program may be stored in advance in a storage device such as an HDD and a flash memory (a storage device including a non-transitory storage medium) of the automated driving control device 100, or stored in a removable storage medium such as a DVD and a CD-ROM, and installed in an HDD or a flash memory of the automated driving control device 100 by installing a storage medium (a non-transitory storage medium) in a drive device. The automated driving control device 100 is an example of a "control device."

Figure 2:
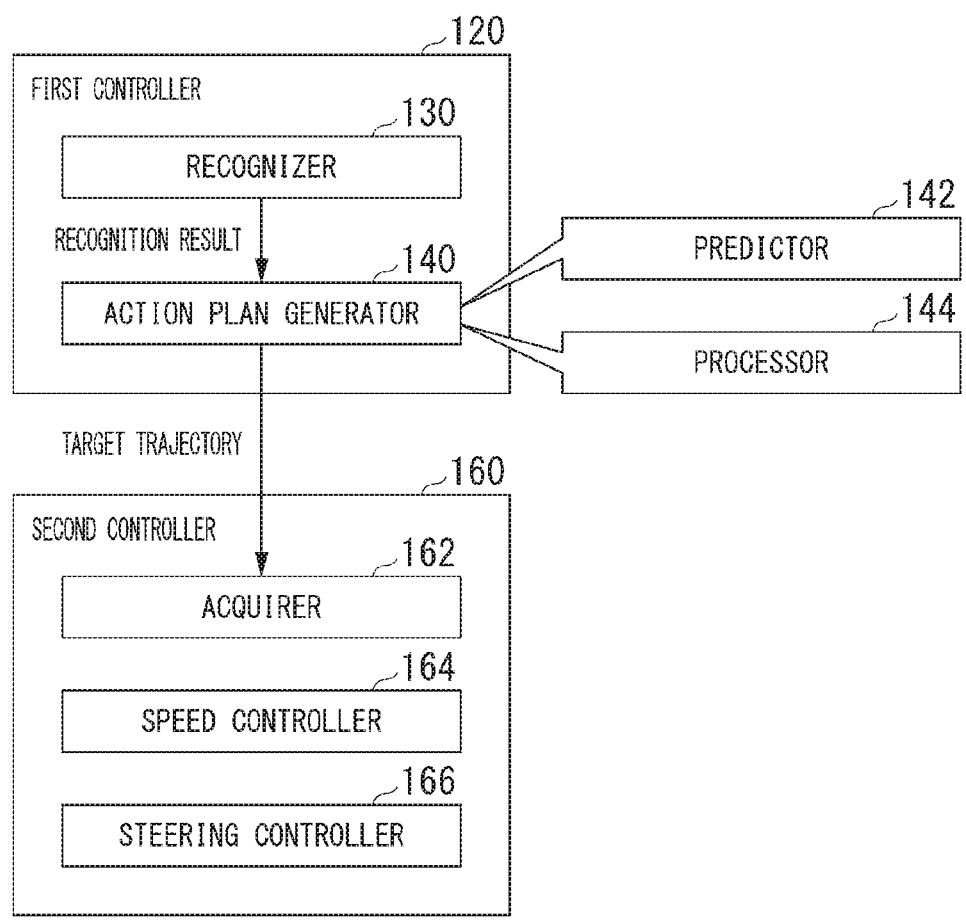
FIG. 2 is a functional constitution diagram of a first controller and a second controller.

FIG. 2 is a functional constitution diagram of the first controller 120 and the second controller 160. The first controller 120 includes, for example, a recognizer 130 and an action plan generator 140. The first controller 120 realizes, for example, a function in which artificial intelligence (AI) is utilized and a function in which a predetermined model is utilized in parallel. For example, a function of "recognizing an intersection" may be realized by performing the recognition of an intersection through deep learning or the like and the recognition based on predetermined conditions (including signals which enable pattern matching, road markings, and the like) in parallel, scoring these recognitions, and performing a comprehensive evaluation. Thus, this ensures the reliability of automated driving.

The recognizer 130 recognizes states such as position, speed, and acceleration of an object present around the subject vehicle M on the basis of information which has been input from the camera 10, the radar device 12, and the LIDAR 14 via the object recognition device 16. The position of the object is recognized as, for example, a position above an absolute coordinate in which a representative point (a center of gravity, a center of a drive axis, or the like) of the subject vehicle M is used as an origin and is used for control. The position of the object may be represented by a representative point such as a center of gravity or a corner of the object or may be represented by a represented region. A "state" of the object may include an acceleration, a jerk, or an "action state" of the object (for example, whether the subject vehicle is changing its lane or whether the subject vehicle is trying to change its lane).

The recognizer 130, for example, recognizes a lane in which the subject vehicle M is traveling (travels in a lane). For example, the recognizer 130 recognizes a traveling lane by comparing a pattern of road marking lines (for example, an array of solid lines and broken lines) obtained from the second map information 62 with a pattern of road marking lines around the subject vehicle M recognized from an image which has been captured by the camera 10. The recognizer 130 may recognize a traveling lane by recognizing not only a road marking line but also a traveling road boundary (a road boundary) including a road marking line, a shoulder, a curb, a median strip, a guardrail, and the like. In this recognition, the position of the subject vehicle M acquired from the navigation device 50 and the processing results obtained using the INS may be taken into consideration. The recognizer 130 recognizes temporarily stop lines, obstacles, red traffic lights, toll gate, and other road events.

The recognizer 130 recognizes a position and a posture of the subject vehicle M with respect to a traveling lane at the time at which a traveling lane is recognized. The recognizer 130 may, for example, recognize the deviation from a center of a lane which is a reference point of the subject vehicle M and an angle formed by the subject vehicle and a virtual line drawn along the center of the lane in a direction in which the subject vehicle M moves forward, as a relative position and posture of the subject vehicle M with respect to a traveling lane. Instead of this, the recognizer 130 may recognize the position of the reference point of the subject vehicle M with respect to one of side end portions of the traveling lane (a road marking line or a road boundary), as a relative position of the subject vehicle M with respect to the traveling lane.

The action plan generator 140 generates a target trajectory in which the subject vehicle M automatically travels (regardless of a driver's operation) in the future so that the subject vehicle can travel in a recommended lane which has been determined by the recommended lane determiner 61 in principle and can respond to surrounding situations of the subject vehicle M. The target trajectory includes, for example, a speed element. For example, the target trajectory is represented as a sequence of points (trajectory points) in which the subject vehicle M needs to reach. The trajectory point is a point in which the subject vehicle M needs to reach for each predetermined traveling distance (for example, about several [m]) in a road distance. In addition, apart from that, a target speed and a target acceleration for each predetermined sampling time (for example, about 0 number [sec]) are generated as a part of the target trajectory. The trajectory point may be a position in which the subject vehicle M needs to reach at a sampling time for each predetermined sampling time. In this case, information concerning a target speed and a target acceleration is represented at intervals between the trajectory points.

The action plan generator 140 may set an event of automated driving at the time at which a target trajectory is generated. The event of automated driving includes a constant speed traveling event, a low speed following traveling event, a lane change event, a branching event, a merging event, a takeover event, and the like. The action plan generator 140 generates a target trajectory according to a started-up event.

The action plan generator 140 includes, for example, a predictor 142 and a processor 144. The processing of the predictor 142 and the processor 144 will be described in detail below. The combination of the recognizer 130, the predictor 142, and the processor 144 described above is an example of a "predicting device."

The second controller 160 controls the traveling/driving force output device 200, the brake device 210, and the steering device 220 so that the subject vehicle M passes through the target trajectory which has been generated by the action plan generator 140 at a scheduled time.

Referring to FIG. 2 again, the second controller 160 includes, for example, an acquirer 162, a speed controller 164, and a steering controller 166. The acquirer 162 acquires information concerning a target trajectory (a trajectory point) which has been generated by the action plan generator 140 and stores the information in a memory (not shown). The speed controller 164 controls the traveling/driving force output device 200 or the brake device 210 on the basis of a speed element associated with a target trajectory which has been stored in the memory. The steering controller 166 controls the steering device 220 in accordance with a degree of bending of the target trajectory which has been stored in the memory. The processing of the speed controller 164 and the steering controller 166 is realized through, for example, a combination of feedforward control and feedback control. As an example, the steering controller 166 performs a combination of feedforward control according to a curvature of a road in front of the subject vehicle M and feedback control based on the deviation from the target trajectory.

The traveling/driving force output device 200 outputs a traveling drive force (a torque) by which the vehicle travels to a drive wheel. The traveling/driving force output device 200 includes, for example, a combination of an internal combustion engine, an electric motor, a transmission, and the like and an electronic controller (ECU) configured to control these. The ECU controls the above constituent elements in accordance with information input from the second controller 160 or information input from the driving operation element 80.

The brake device 210 includes, for example, a brake caliper, a cylinder which transmits hydraulic pressure to the brake caliper, an electric motor which generates hydraulic pressure in the cylinder, and a brake ECU. The brake ECU controls the electric motor in accordance with information input from the second controller 160 or information input from the driving operation element 80 so that a brake torque according to a braking operation is output to each wheel. The brake device 210 may include, as a backup, a mechanism which transmits hydraulic pressure generated through an operation of the brake pedal included in the driving operation element 80 to the cylinder via a master cylinder. The brake device 210 is not limited to the constitution described above and may be an electronically controlled hydraulic pressure brake device in which hydraulic pressure of the master cylinder is transmitted to the cylinder by controlling an actuator in accordance with information input from the second controller 160.

The steering device 220 includes, for example, a steering ECU and an electric motor. The electric motor, for example, changes a direction of a steered wheel by applying a force to a rack and pinion mechanism. The steering ECU drives the electric motor in accordance with information input from the second controller 160 or information input from the driving operation element 80 to change the direction of the steered wheel.

[Details of Predictor]

The predictor 142 predicts a position of the moving body in the future on the basis of the recognition results of the recognizer 130. The predictor 142 predicts a position of a pedestrian PD in the future on the basis of a predetermined algorithm. The predetermined algorithm simulates the movement of the pedestrian PD at respective future steps (times) under predetermined assumptions. In this case, the movement of each step of the pedestrian PD in the future may be made in consideration of influences from other traffic participants. Instead of this, the predetermined algorithm may be an algorithm in which a trajectory is fitted through a multi-dimensional equation, assuming that acceleration and speed are constant.

[Details of Processor]

(Setting of Risk Region)

The processor 144 determines whether to set a first risk region for the moving body or a second risk region larger than the first risk region for the moving body on the basis of a deviation between the first position of the moving body recognized by the recognizer 130 and the second position of the moving body in the future which has been predicted previously by the predictor 142. Hereinafter, when a first risk region and a second risk region are not distinguished, they may be referred to as "risk region in some cases. The risk region will be described in detail later. The "first position" is a position of the moving body which has been recognized by the recognizer 130 and the "second position" is a position of the moving body which has been predicted by the predictor 142.

The "moving body" includes a person, an animal, and the like. The moving body includes a pedestrian, a bicycle, a wheelchair, and the like. In the following description, it is assumed that the moving body is a pedestrian.

Figure 3:
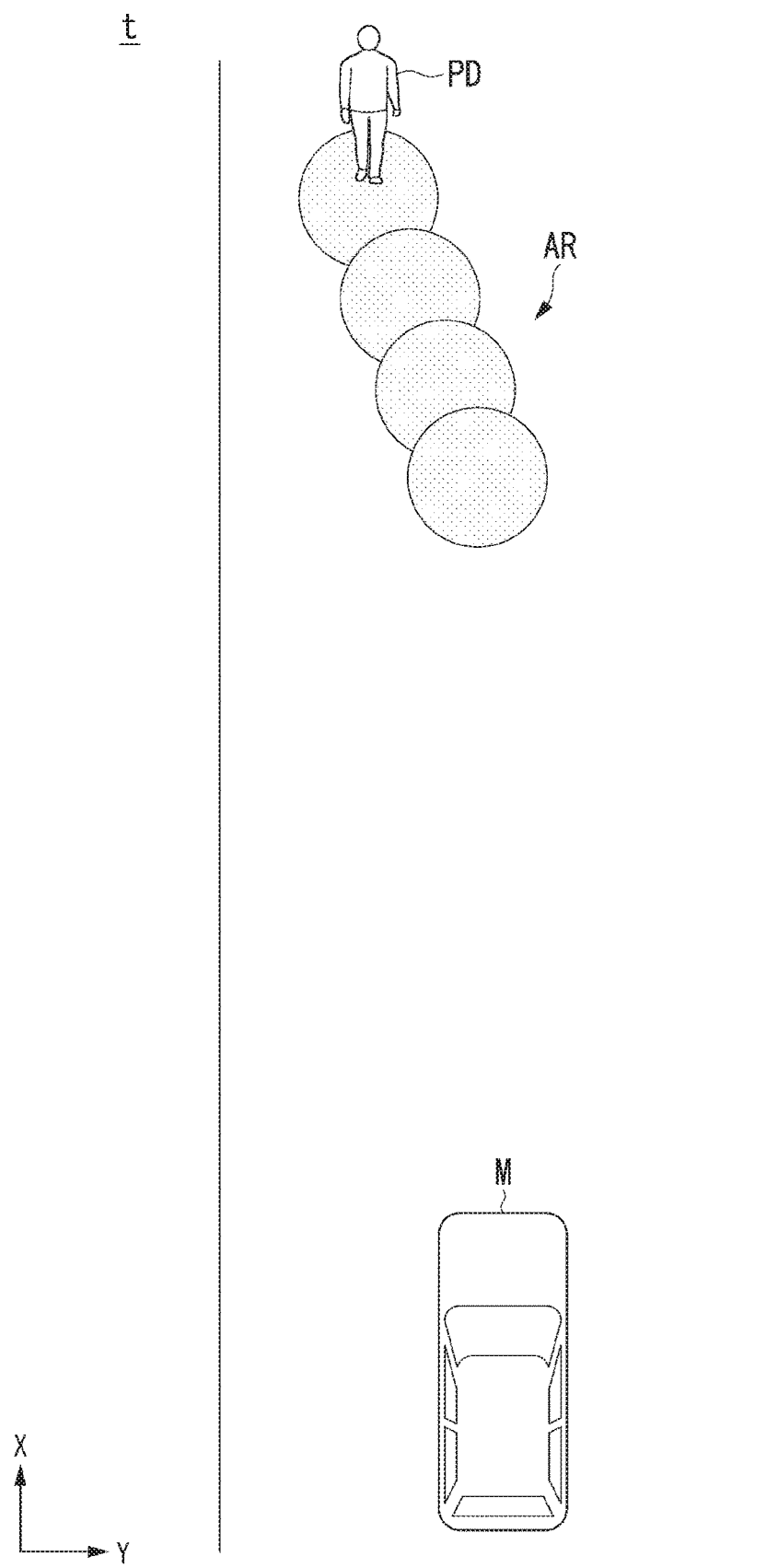
FIG. 3 is a diagram illustrating an example of a scene in which a risk region is set.

FIG. 3 is a diagram illustrating an example of a scene in which a risk region is set. For example, when a pedestrian PD present in a direction in which the subject vehicle M moves forward is present while the subject vehicle M is traveling on a road, the processor 144 may set a risk region AR for a region including the pedestrian PD and a position of the pedestrian PD in the future. For example, the risk region AR is set through the following procedure.

Figure 4:
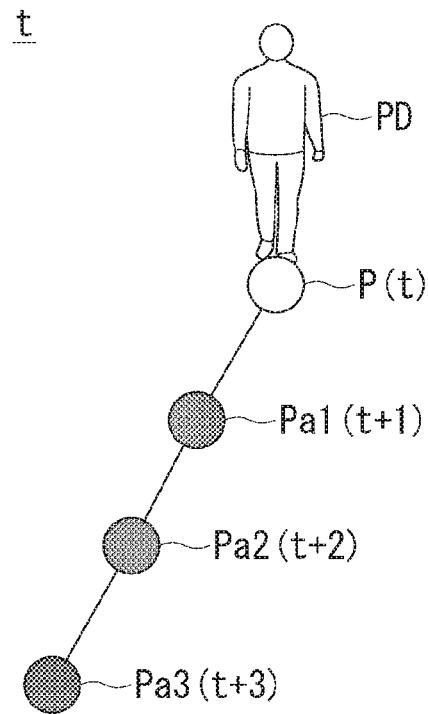
FIG. 4 is a diagram showing a predicted position of a pedestrian PD.

First, the processor 144 acquires the position of the pedestrian PD which has been predicted by the predictor 142. FIG. 4 is a diagram showing the predicted position of the pedestrian PD. For example, as shown in FIG. 4, the processor 144 acquires a position Pa1(t+1), a position Pa2(t+2), and a position Pa3(t+3) which have been predicted at time t. The position Pa1(t+1), the position Pa2(t+2), and the position Pa3(t+3) are positions at which the pedestrian PD is predicted to be present at time t+1, a position at which the pedestrian PD is predicted to be present at time t+2, and a position at which the pedestrian PD is predicted to be present at time t+3. A position P(t) is a position of the pedestrian PD at time t.

Figure 5:
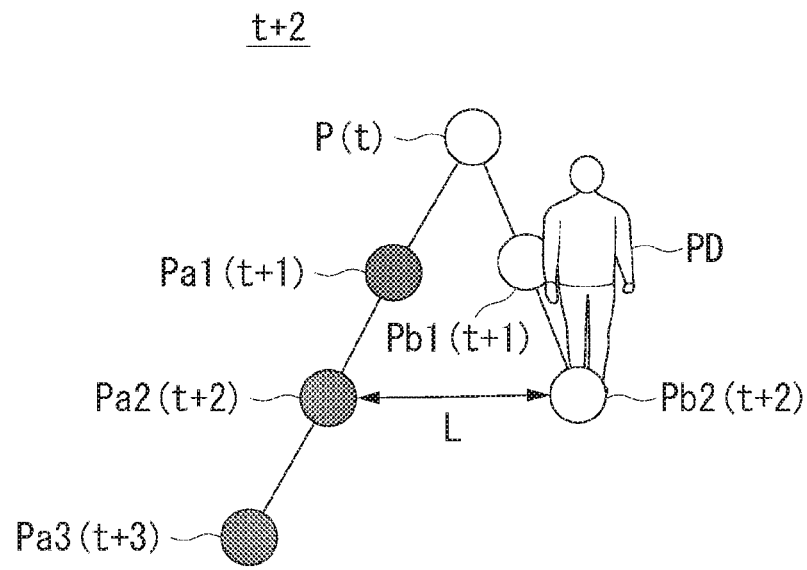
FIG. 5 is a diagram showing a recognized position of a pedestrian PD.

Subsequently, the processor 144 acquires a position of the pedestrian PD which has been recognized by the recognizer 130 from time t to a predetermined time (for example, time+2). FIG. 5 is a diagram showing the recognized position of the pedestrian PD. For example, as shown in FIG. 5, the processor 144 acquires a position Pb1(t+1) and a position Pb2(t+2). The position Pb1(t+1) and the position Pb2(t+2) are a position of the pedestrian PD which has been recognized at time t+1 and a position of the pedestrian PD which has been recognized at time t+2.

Subsequently, the processor 144 determines whether a position (a first position) of the moving body which has been recognized by the recognizer 130 has a deviation of a first predetermined degree or more (for example, a deviation of a distance L or more) from a position of the moving body in the future (a second position) which has been predicted previously by the predictor 142. For example, when the position Pa2(t+2) and the position Pb2(t+2) do not deviate from each other the first predetermined degree or more, the processor 144 sets the first risk region for a current position of the moving body or a position of the moving body in the future. When the position Pa2(t+2) and the position Pb2(t+2) have a deviation of the first predetermined degree or more from each other, the processor 144 sets the second risk region for the current position of the moving body or the position of the moving body in the future. The second risk region is a region larger than the first risk region.

For example, when the following conditions are satisfied, the processor 144 determines that the position of the moving body which has been recognized by the recognizer 130 will deviate from the position of the moving body in the future which has been predicted previously by the predictor 142 by the first predetermined degree or more.

(1) The first position at time t+n deviates from a second position at time t+n by the first predetermined degree or more. "n" is an arbitrary natural number. In this case, a value of the first predetermined degree may be changed in accordance with the time "n."

For example, the position Pa2(t+2) and the position Pb2(t+2) may deviate by the first predetermined degree or more in some cases.

Time t is an example of a "first time" and time t+2 is an example of a "second time."

(2) A value obtained by summing or averaging the deviations between the first position and the second position which have been obtained at each time is a threshold value or more. For example, a sum of a distance between the position Pa1(t+1) and the position Pb1(t+1) and a distance between the position Pa2(t+2) and the position Pb2(t+2) is the first predetermined degree or more.

(3) The above condition (1) or (2) may be satisfied consecutively in a plurality of processing cycles in some cases. For example, when the condition that the first position at time t+n deviates from the second position at time t+n by the first predetermined degree or more is satisfied continuously in a plurality of (for example, three) processing cycles, it may be determined that the first position and the second position deviate from each other by the first predetermined degree or more.

The "risk region" is a region in which a risk potential is set. The "risk potential" is an index value indicating a level of a risk when the subject vehicle M enters a region in which a risk potential has been set. The first risk region and the second risk region are regions in which a risk potential which is an index value of a predetermined size (an index value exceeding zero) has been set.

Figure 6:
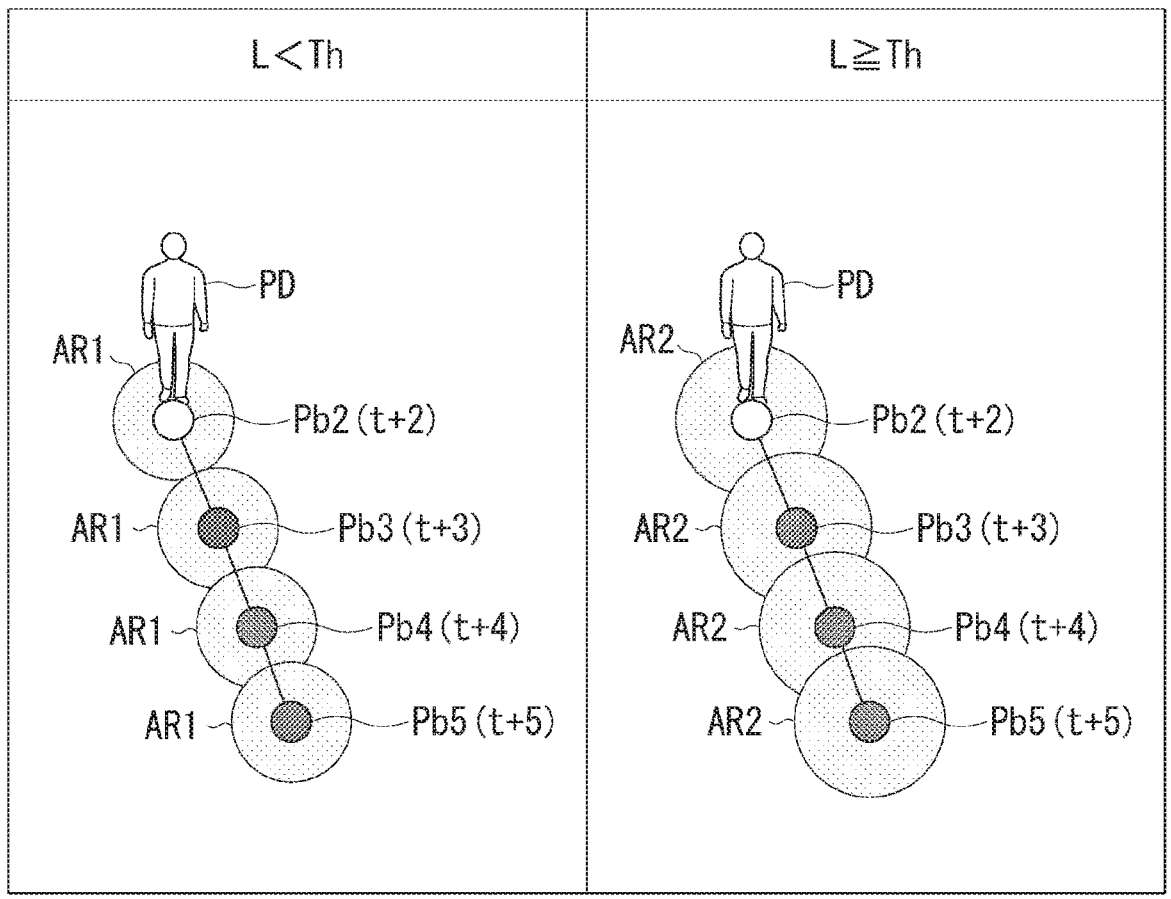
FIG. 6 is a diagram showing a first risk region and a second risk region.

FIG. 6 is a diagram showing the first risk region and the second risk region. In FIG. 6, a position Pb3(t+3), a position Pb4(t+4), and a position Pb5(t+5) are positions of the pedestrian PD in the future which have been predicted by the predictor 142 on the basis of current states (a position, a moving direction, and a speed) (at time t+2) of the pedestrian PD and previous states of the pedestrian PD. For example, when the distance L is less than a threshold value Th (less than the first predetermined degree), the processor 144 sets a first risk region AR1 for Pb2(t+2)-Pb5(t+5). For example, when the distance L is the threshold value Th or more, the processor 144 sets a second risk region AR2 for Pb2(t+2)-Pb5(t+5).

The risk region is set, for example, centering on the position of the moving body or the position of the moving body in the future. For example, the risk region may be set such that a value of a risk potential at a central point of a moving body has a maximum value and the value of the risk potential decreases spreading outward to the periphery thereof. For example, the risk potential in the risk region may be represented by a distribution indicating a risk such as a Gaussian distribution. For example, the risk region may be set such that the region thereof in the direction in which the moving body is moving around the moving body is larger than the regions in the other directions (or set such that a value of a risk potential in a direction in which the moving body is moving is larger than values of risk potentials in other directions). A risk region at a position of the moving body further in the future from the present is set to be larger (or such that the value of the risk potential is smaller) than that of a position of the moving body in the near future from the present.

When the second risk region AR2 is set and then the deviation between the first position and the second position is less than a predetermined degree (the second predetermined degree), the processor 144 may set a risk region (the first risk region AR1) smaller than the second risk region AR2 for the moving body. The predetermined degree (a second predetermined degree) at this time may be a degree which is different from a predetermined degree (a first predetermined degree) which is a reference used for setting the second risk region AR. For example, the second predetermined degree may be a degree which is smaller than the first predetermined degree.

Figure 7:
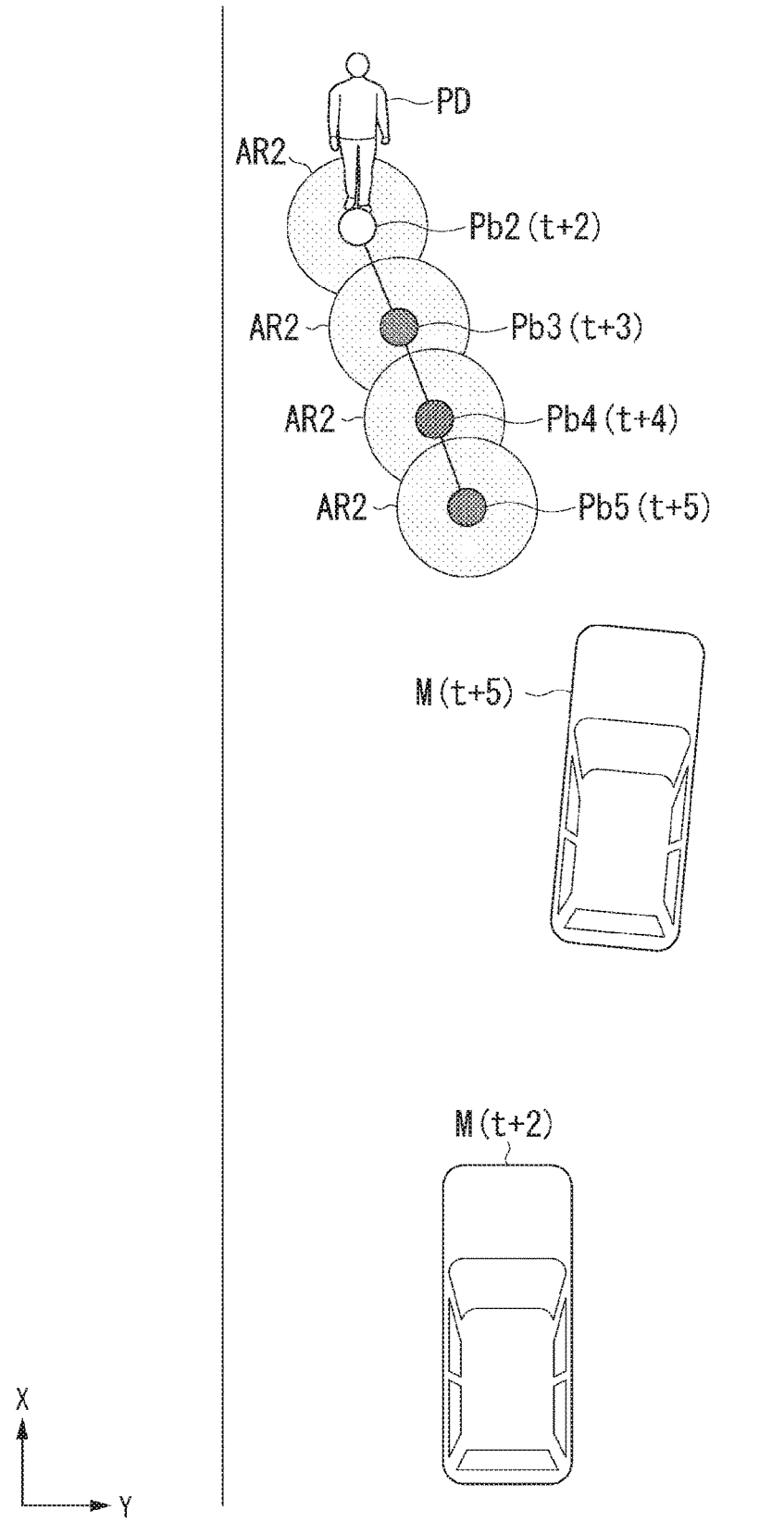
FIG. 7 is a diagram illustrating an example of the behavior of a subject vehicle.

FIG. 7 is a diagram illustrating an example of a behavior of the subject vehicle M. For example, when the second risk region AR2 is set as described above, the automated driving control device 100 controls the subject vehicle M such that the second risk region is avoided. For example, at time t+5, the automated driving control device 100 controls the subject vehicle M so that the subject vehicle M does not approach the second risk region AR2 corresponding to a position Pb5(time+5).

In this way, the processor 144 can derive a risk of the moving body in the future with higher accuracy by setting a larger risk region for a moving body with unstable movement or a moving body with unexpected movement. Furthermore, the automated driving control device 100 can perform traveling while minimizing a risk of approaching a moving body whose movement is unstable or a moving body in which unexpected movement is performed.

(Change in Sampling Rate)

At least one of the recognizer 130 and the predictor 142 changes a processing cycle on the basis of the deviation between the position of the moving body which has been recognized by the recognizer 130 and the position of the moving body in the future which has been predicted previously by the predictor 142. At least one of the recognizer 130 and the predictor 142 does not change the processing cycle when the deviation between the first position of the moving body at the second time which has been recognized by the recognizer 130 and the second position of the moving body at the second time which has been predicted at the first time before the second time by the predictor 142 is less than the first predetermined degree and changes the processing cycle when the deviation between the first position of the moving body at the second time which has been recognized by the recognizer 130 and the second position of the moving body at the second time which has been predicted at the first time before the second time by the predictor 142 is the first predetermined degree or more.

Figure 8:
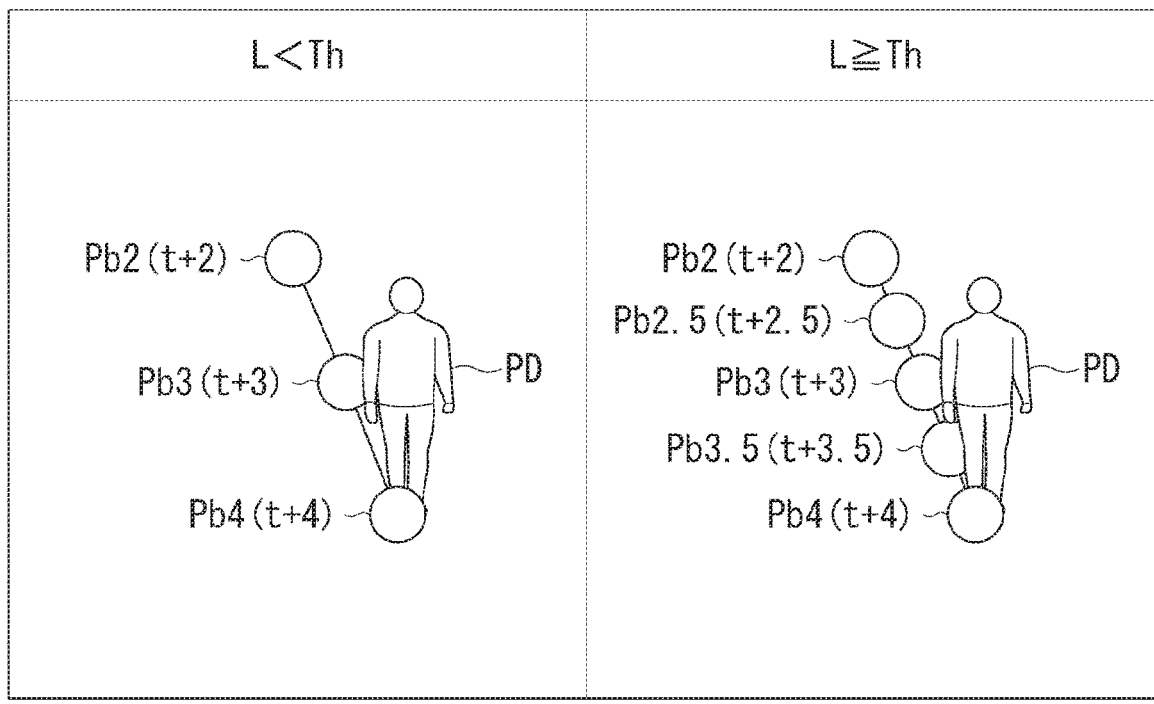
FIG. 8 is a diagram showing a change in sampling rate.

FIG. 8 is a diagram showing a change in sampling rate. Differences between FIGS. 5 and 8 will be mainly described. For example, the processor 144 causes the recognizer 130 to increase a sampling rate of recognition processing when the position Pa2(t+2) and the position Pb2(t+2) deviate from each other by the first predetermined degree or more as described above with reference to FIG. 5. For example, as shown in FIG. 8, the sampling rate may be doubled. Hereinafter, a sampling rate which has been increased is referred to as a "second sampling rate" and a sampling rate which has not been increased is referred to as a "first sampling rate."

Also, the processor 144 causes the predictor 142 to predict a position of the moving body in the future for each result of the recognition processing. That is to say, the predictor 142 increases a sampling rate of prediction processing.

Figure 9:
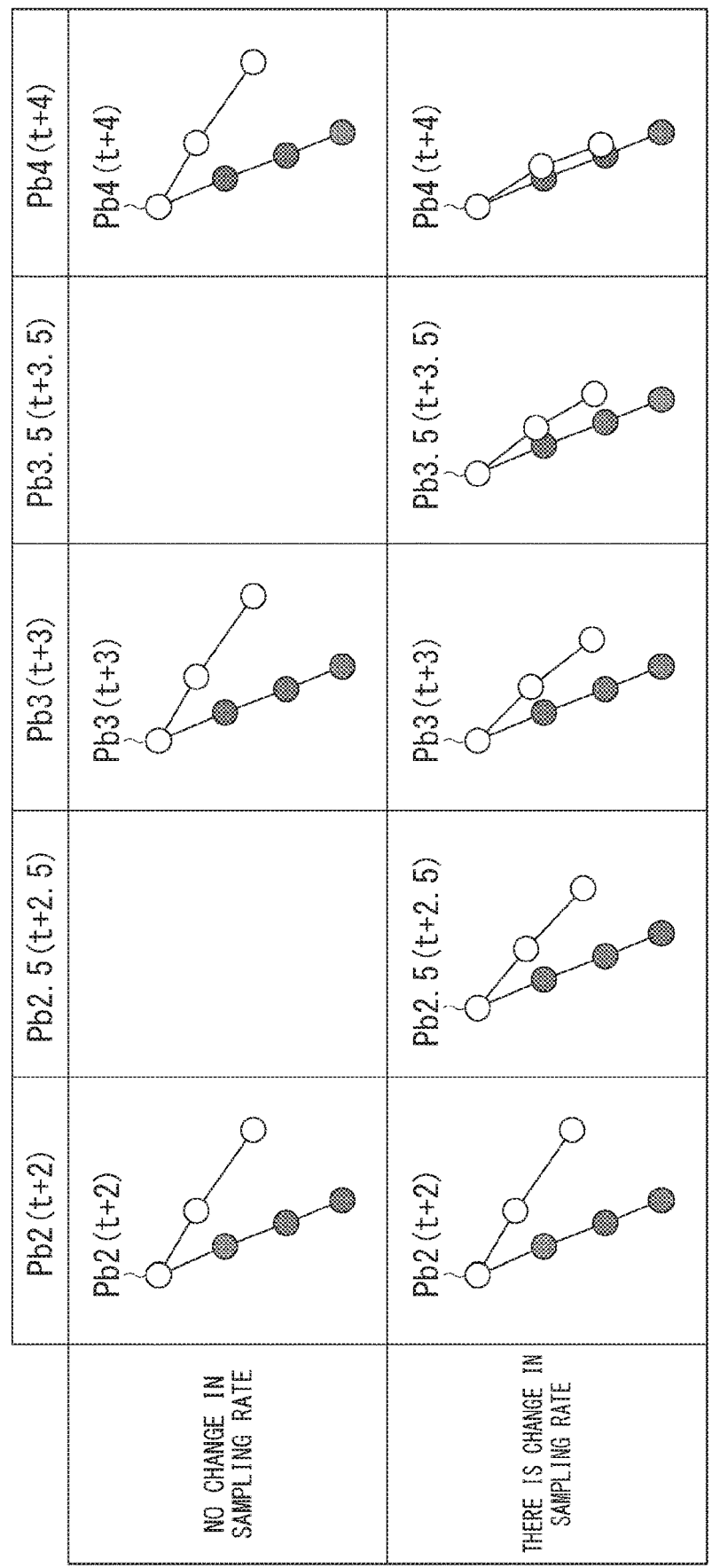
FIG. 9 is a diagram showing processing when a processor raises a sampling rate and the processor does not raise the sampling rate.

FIG. 9 is a diagram showing processing when the processor 144 increases a sampling rate and when the processor 144 does not increase a sampling rate. For example, when the processor 144 does not change (does not increase) the sampling rate, a case in which the deviation between the first position and the second position is not reduced rapidly may be present in some cases. On the other hand, when the processor 144 changes (increases) the sampling rate, the prediction result of the predictor 142 tends to approach an actual position of the moving body. Thus, the deviation between the first position and the second position is reduced.

In this way, the processor 144 can rapidly reduce the deviation between the first position and the second position by increasing the sampling rate and can set a risk region with higher accuracy.

Although a description of the processor 144 in which a sampling rate is increased when the deviation between the first position and the second position is the first predetermined degree or more has been provided in the example described above, instead of this, when the deviation between the first position and the second position is less than the first predetermined degree, the sampling rate may be reduced.

The processor 144 may interpolate a position of the moving body which has not been recognized on the basis of the position of the moving body which has been recognized through the recognition processing. For example, the processor 144 may interpolate a position Pa2.5 (t+2.5) on the basis of the position Pa2(t+2) and the position Pa3(t+3). In addition to (or instead of) the process in which the sampling rate is increased, the processor 144 may interpolate the position of the moving body in the future which has not be predicted on the basis of the position of the moving body which has been predicted through the prediction processing. For example, the processor 144 may interpolate the position of the moving body in the future at a position Pb3.5(t+3.5) on the basis of the position Pb2(t+2) and the position Pb3(t+3) which have been predicted by the predictor 142.

The predictor 142 may perform the prediction processing of a predetermined processing cycle on the basis of the previous prediction result.

The predictor 142 may increase the sampling rate of the prediction processing at the time at which the sampling rate is increased. FIG. 10 is a diagram showing an increase in sampling rate. For example, it is assumed that the recognizer 130 recognizes a position of the moving body at each of time T to time T+4. When the sampling rate is not changed, the predictor 142 performs the prediction processing at each of time T, time T+2, and time T+4 and predicts a position of the moving body in the future. Furthermore, at time T, time T+2, and time T+4, the processor 144 determines a risk region to be set or changes a sampling rate on the basis of the position of the moving body at that time and the position of the moving body in the future obtained by the previous prediction processing.

On the other hand, when the sampling rate is changed, the predictor 142 performs the prediction processing at each of time T to time T+4 and predicts a position of the moving body in the future. Furthermore, at each of time T to time T+4, the processor 144 determines a risk region to be set or changes a sampling rate on the basis of the position of the moving body at that time and the position of the moving body in the future which has been obtained through the previous prediction processing. In this way, the processor 144 can rapidly reduce the deviation between the first position and the second position by increasing the sampling rate and set a risk region with higher accuracy.

At least one of the recognizer 130 and the predictor 142 may change the processing cycle to the cycle before the change when the processing cycle is changed and then the deviation between the first position and the second position is less than a predetermined degree (a third predetermined degree). The processing cycle which has been changed is, for example, a second sampling rate and the processing cycle before the change is, for example, a first sampling rate. The third predetermined degree may have the same value as the first predetermined degree or may have a different value. The third predetermined degree is, for example, a degree smaller than the first predetermined degree.

Figure 11:
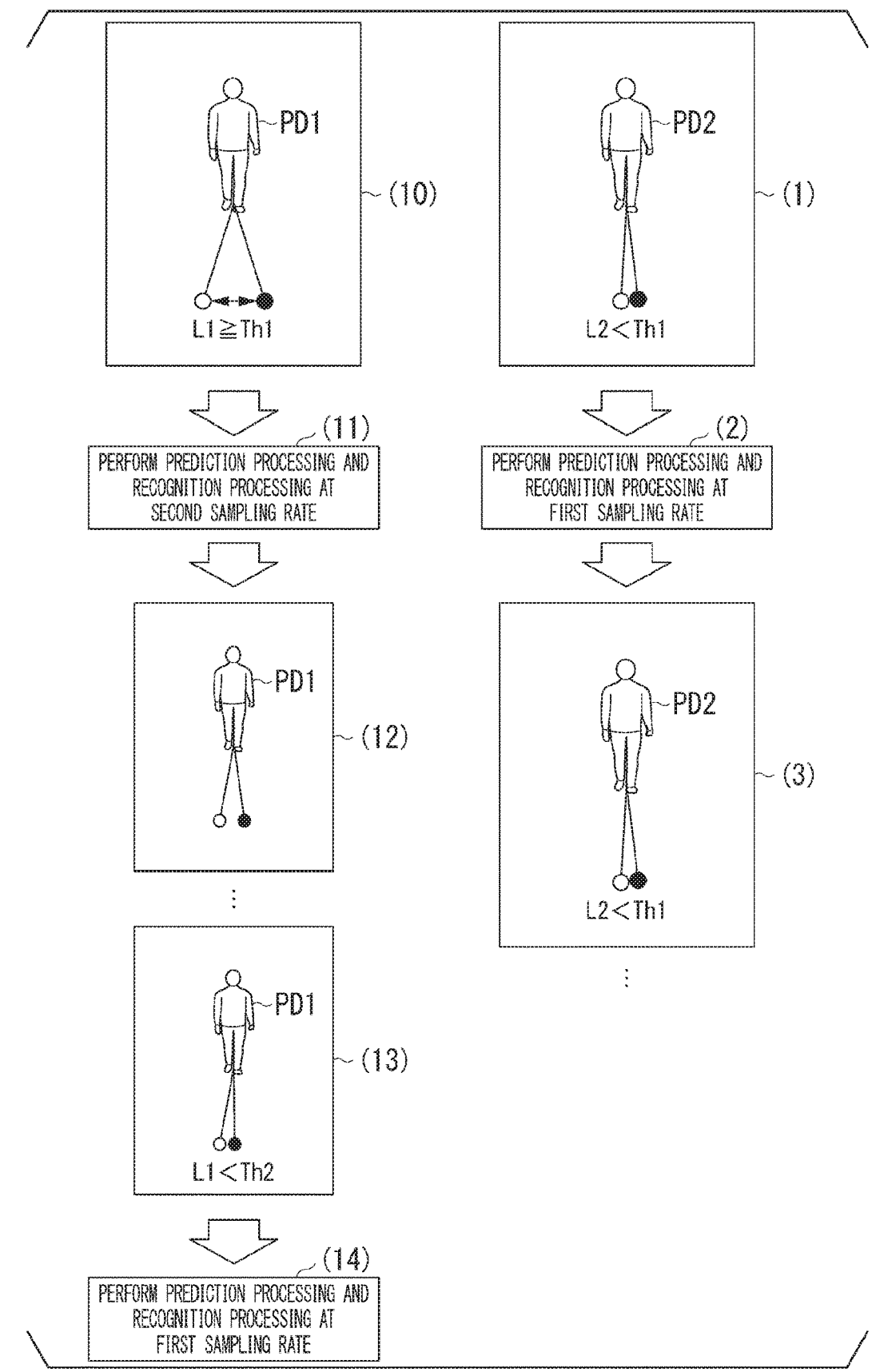
FIG. 11 is a conceptual diagram of processing when a sampling rate is changed and when the sampling rate is not changed.

FIG. 11 is a conceptual diagram of a process when a sampling rate is change and when the sampling rate is not changed. When the deviation between the first position and the second position is less than the threshold value Th1 (1), the processor 144 performs the process at the first sampling rate (2). Also in the subsequent process, the process is performed at the first sampling rate (3).

When the deviation between the first position and the second position is the threshold value Th1 or more (10), the processor 144 performs the process at the second sampling rate (11). The second sampling rate is a sampling rate having a higher sampling rate than the first sampling rate. Also in the subsequent process, the process is performed at the second sampling rate (12). If the process is performed at the second sampling rate and the deviation between the first position and the second position is less than the threshold value Th2 (13), the processor 144 performs the process at the first sampling rate (14). For example, the threshold value Th1 and the threshold value Th2 may have the same value or different values. The threshold value Th1 may be a value larger or smaller than the threshold value Th2.

In this way, the processor 144 can set a risk region for the moving body with higher accuracy while reducing a processing load by changing the sampling rate in accordance with the deviation between the first position and the second position.

(Process According to Determination Concerning Whether Specific Conditions are Satisfied)

When specific conditions are satisfied, the processor 144 may cause a predictor 142 to perform the prediction processing in which the predictor 142 predicts a position of the moving body in the future using a cycle time (a sampling rate) shorter than that before the specific condition is satisfied or cause the recognizer 130 to perform the recognition processing in which the recognizer 130 recognizes the states of the moving body. The specific conditions include the fact that the first position of the moving body which has been recognized by the recognizer 130 deviates from the second position of the moving body in the future which has been predicted previously by the predictor 142 by a predetermined degree (the first predetermined degree) or more and the moving body is present in a predetermined range from a reference position. Hereinafter, the moving body present in the predetermined range from the reference position (for example, a position of the subject vehicle M) may be referred to as a "predetermined moving body" in some cases.

The processor 144 may apply a second sampling rate to a process for a predetermined moving body among a plurality of moving bodies. The predetermined moving body is a moving body in which a degree of influence associated with the traveling of the subject vehicle M is a predetermined degree or more. The predetermined moving body is, for example, a pedestrian PD present within a predetermined distance from the subject vehicle M.

Figure 12:
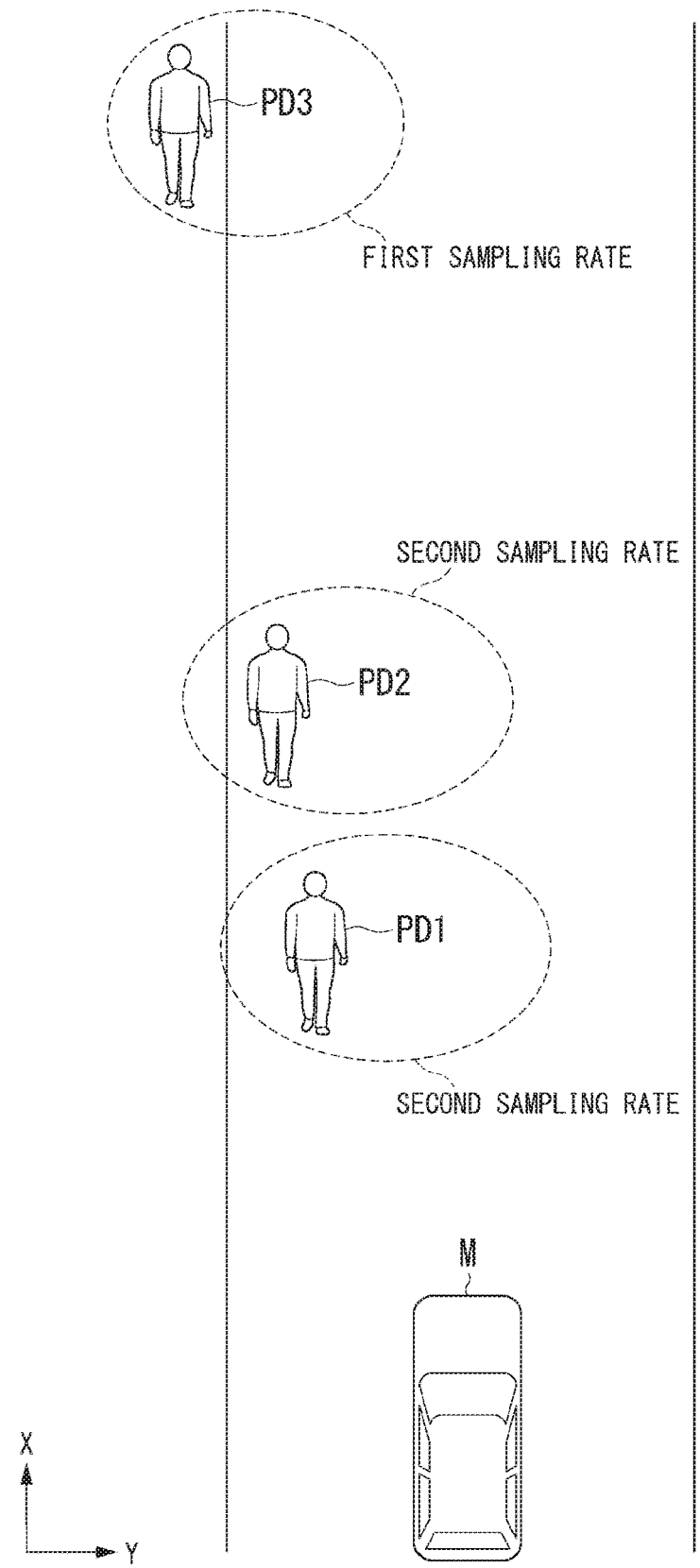
FIG. 12 is a diagram showing a predetermined moving body.

FIG. 12 is a diagram showing a predetermined moving body. For example, the processor 144 applies a second sampling rate in the process of a pedestrian PD1 and a pedestrian PD2 which are predetermined moving bodies and applies a first sampling rate to the process of a pedestrian PD3 which is a predetermined moving body.

In this way, the processor 144 can set a risk region for the moving body with higher accuracy while reducing a processing load by applying the second sampling rate in the process of the predetermined moving body.

When the specific condition is satisfied, in a case in which the deviation between the first position and the second position is the first predetermined degree or more with respect to the moving body in which the specific condition is satisfied, the processor 144 may set a second risk region for this moving body. In this case, even when the deviation between the first position and the second position is the first predetermined degree or more, in a case in which the specific condition is not satisfied, the processing unit 144 may set a first risk region for this moving body without setting the second risk region.

(Others)

Figure 13:
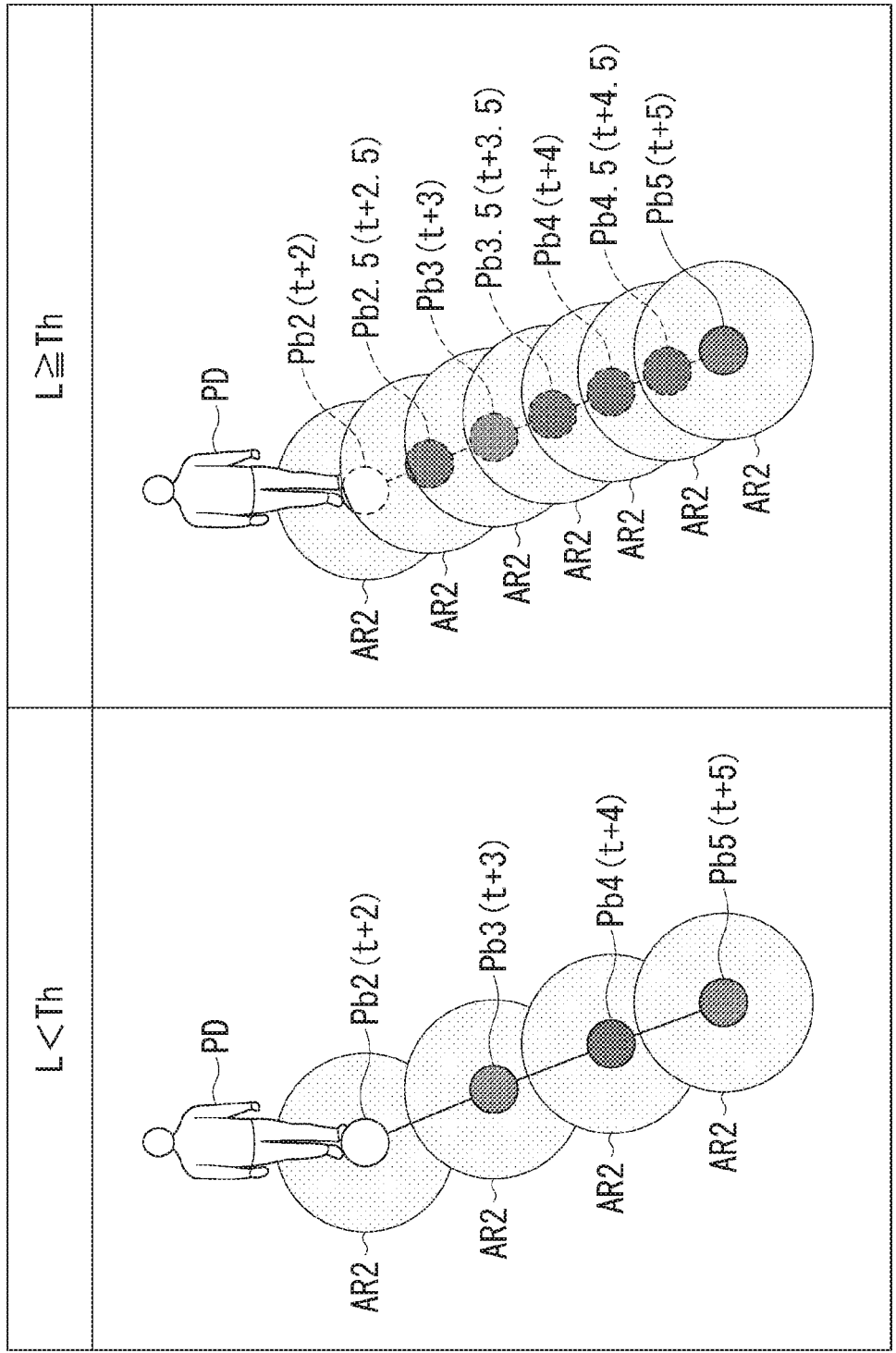
FIG. 13 is a diagram showing a change in sampling rate.

In the prediction processing, the sampling rate may be changed as will be described later. FIG. 13 is a diagram showing a change in sampling rate. A difference between FIGS. 6 and 13 will be mainly described. For example, the processor 144 increases the sampling rate of the prediction processing when the deviation between the position Pa2(t+2) and the position Pb2(t+2) is the first predetermined degree or more. For example, positions such as a position Pb2(t+2), a position Pb2.5(t+2.5), a position Pb3(t+3), a position Pb3.5(t+3.5) . . . are predicted by doubling the sampling rate.

In this way, the processor 144 can predict a position of the moving body in the future with higher accuracy by increasing the sampling rate and can derive a risk of the moving body in the future with higher accuracy.

The processor 144 may perform a process in which the sampling rate is changed on the basis of a determination concerning whether the deviation between the first position and the second position is the first predetermined degree or more while the process in which the first risk region and the second risk region are switched and set is omitted. That is to say, a function of performing the process of setting a second risk region is omitted in the automated driving control device 100. In addition, at least one of the recognizer 130 and the predictor 142 may have a function of changing a processing cycle on the basis of the deviation between the position of the moving body which has been recognized by the recognizer 130 and the position of the moving body in the future which has been predicted previously by the predictor 142.

As described above, the processor 144 can quickly reduce the deviation between the first position and the second position by increasing the sampling rate.

[Flowchart (One of Flowcharts)]

Figure 14:
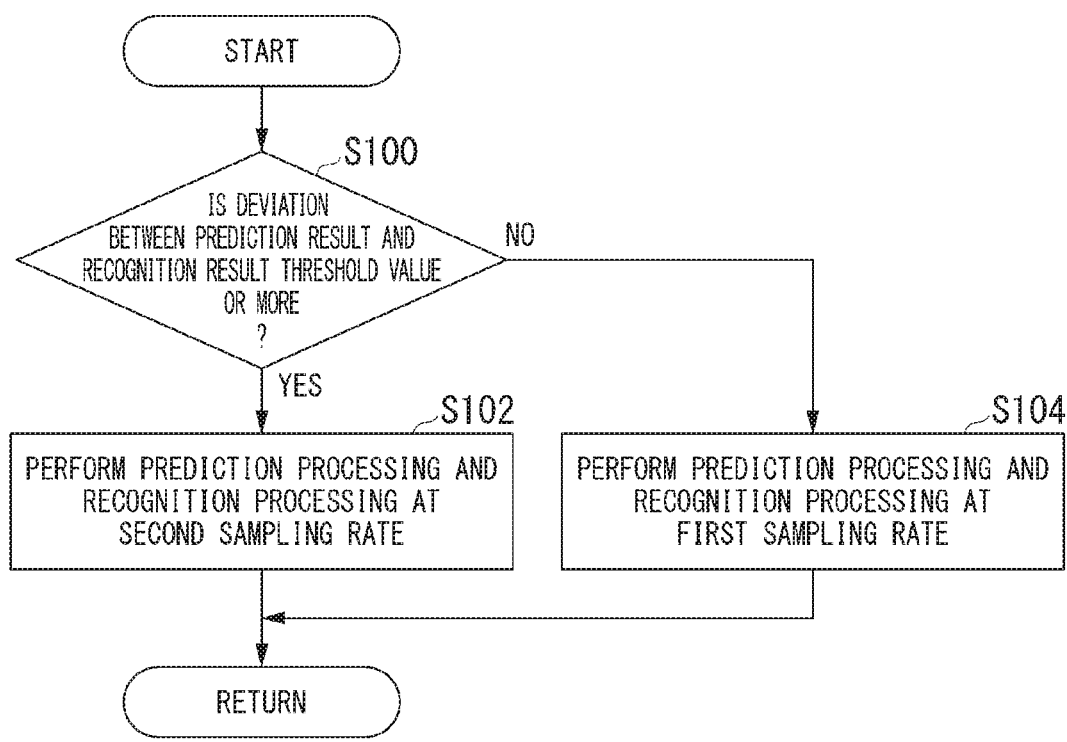
FIG. 14 is a flowchart showing an example of a flow of processing performed by the processor.

FIG. 14 is a flowchart showing an example of a flow of a process performed using the processor 144. First, the processor 144 determines whether the deviation between the first position of the moving body which has been predicted by the predictor 142 and the second position of the moving body which has been recognized by the recognizer 130 is the first predetermined degree or more (Step S100).

When the deviation between the first position and the second position is the first predetermined degree or more, the processor 144 causes the recognizer 130 to perform the recognition processing at the second sampling rate and causes the predictor 142 to perform the prediction processing at the second sampling rate (Step S102). When the deviation between the first position and the second position do not deviate from each other by the first predetermined degree or more, the processor 144 causes the recognizer 130 to perform the recognition processing at the first sampling rate and causes the predictor 142 to perform the prediction processing at the first sampling rate (Step S104). Thus, this completes the process of one routine of this flowchart.

As described above, the processor 144 can set a risk region for the moving body with higher accuracy while reducing a processing load by changing the sampling rate on the basis of a degree of deviation between the first position and the second position.

[Flowchart (One of Flowcharts)]

Figure 15:
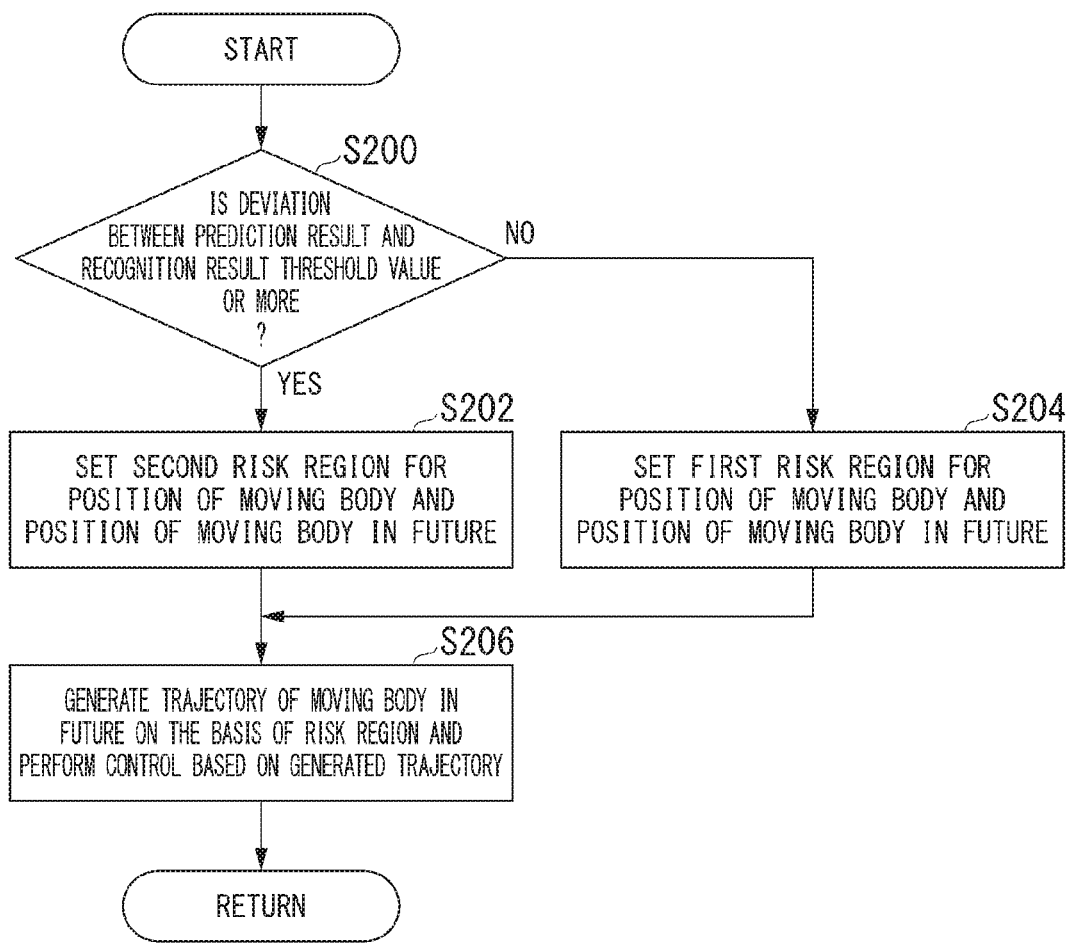
FIG. 15 is a flowchart showing an example of a flow of processing performed by the processor.

FIG. 15 is a flowchart showing an example of a flow of a process performed using the processor 144. First, the processor 144 determines whether the deviation between the first position of the moving body which has been predicted by the predictor 142 and the second position of the moving body which has been recognized by the recognizer 130 is the first predetermined degree or more (Step S200).

When the deviation between the first position and the second position is the first predetermined degree or more, the processor 144 sets a second risk region for a position of the moving body and a position of the moving body in the future (Step S202). When the deviation between the first position and the second position is not the first predetermined degree or more, the processor 144 sets a first risk region for a position of the moving body and a position of the moving body in the future (Step S204). The processor 144 sets a risk region, generates a trajectory in the future on the basis of the risk region, and then performs control based on the generated trajectory (Step S206). Thus, this completes the process of one routine of this flowchart.

As described above, the processor 144 can cause the subject vehicle M to travel at a position sufficiently away from the moving body by performing control based on the risk region. For example, the processor 144 can cause the subject vehicle M to travel at a position sufficiently away from the moving body by setting the second risk region for the moving object which has an unstable behavior or in which an unexpected behavior is performed.

According to the first embodiment described above, the processor 144 can set a risk region for the moving body with higher accuracy by changing the risk region on the basis of a degree of deviation between the first position and the second position. The processor 144 can rapidly reduce a degree of deviation while reducing a processing load by changing the sampling rate on the basis of the degree of deviation between the first position and the second position.

MODIFIED EXAMPLE

Figure 16:
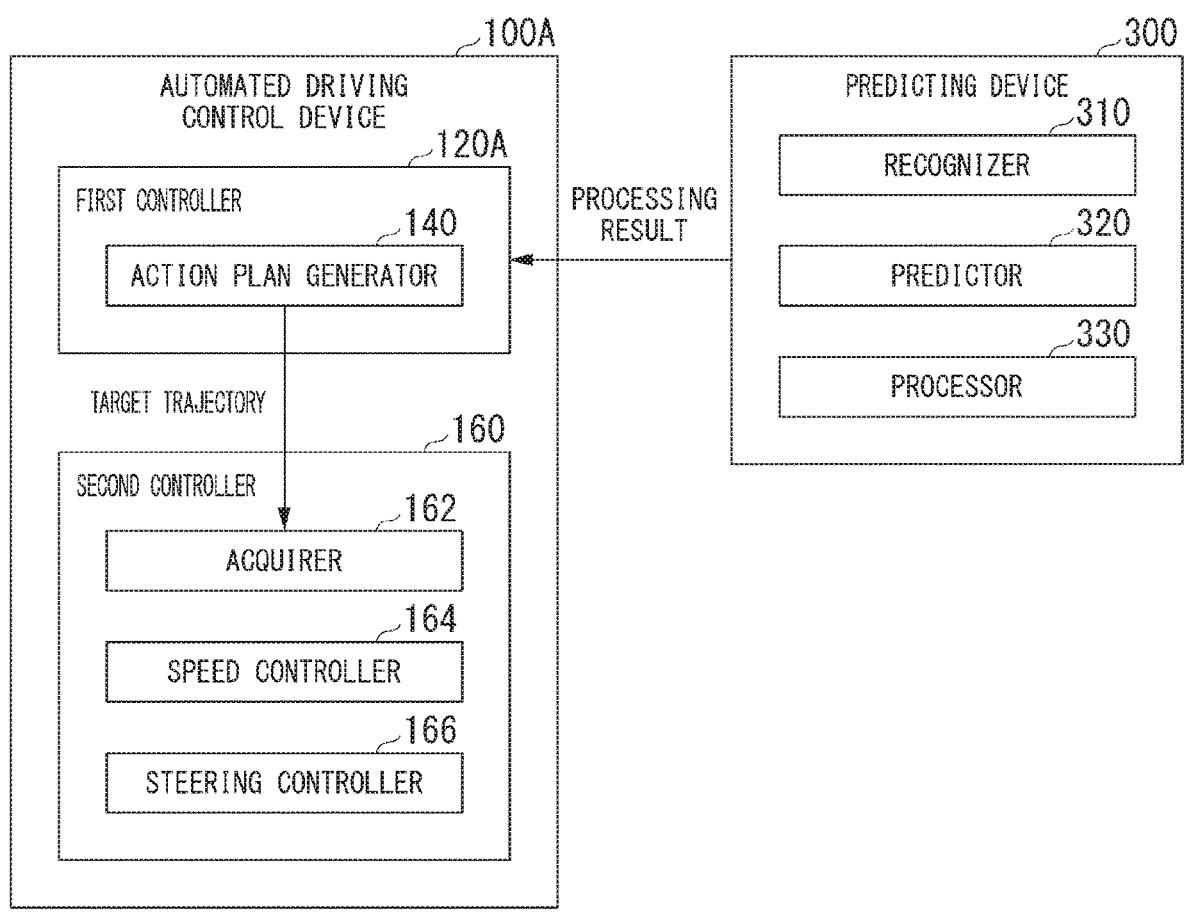
FIG. 16 is a diagram illustrating an example of a functional constitution of the vehicle system.

FIG. 16 is a diagram illustrating an example of a functional constitution of the vehicle system 1. A vehicle system 1A includes an automated driving control device 100A instead of the automated driving control device 100. The vehicle system 1A includes a predicting device 300. Illustration and description of constituent elements other than the automated driving control device 100 described in the first embodiment will be omitted.

The automated driving control device 100A includes, for example, a first controller 120A and a second controller 160. The first controller 120A includes an action plan generator 140.

The predicting device 300 includes, for example, a recognizer 310, a predictor 320, and a processor 330. The recognizer 310 acquires, for example, the processing result of an object recognition device 16 and performs the recognition processing as in the recognizer 130 in the first embodiment. The predictor 320 has the same function as the predictor 142 and the processor 330 has the same function as the processor 144. The processor 330 provides the processing result to the automated driving control device 100A. The automated driving control device 100A controls the subject vehicle M on the basis of the processing result (for example, the risk region) of the processor 330.

According to the modified example described above, the same effects as those in the first embodiment are obtained.
[Hardware Constitution]

Figure 17:
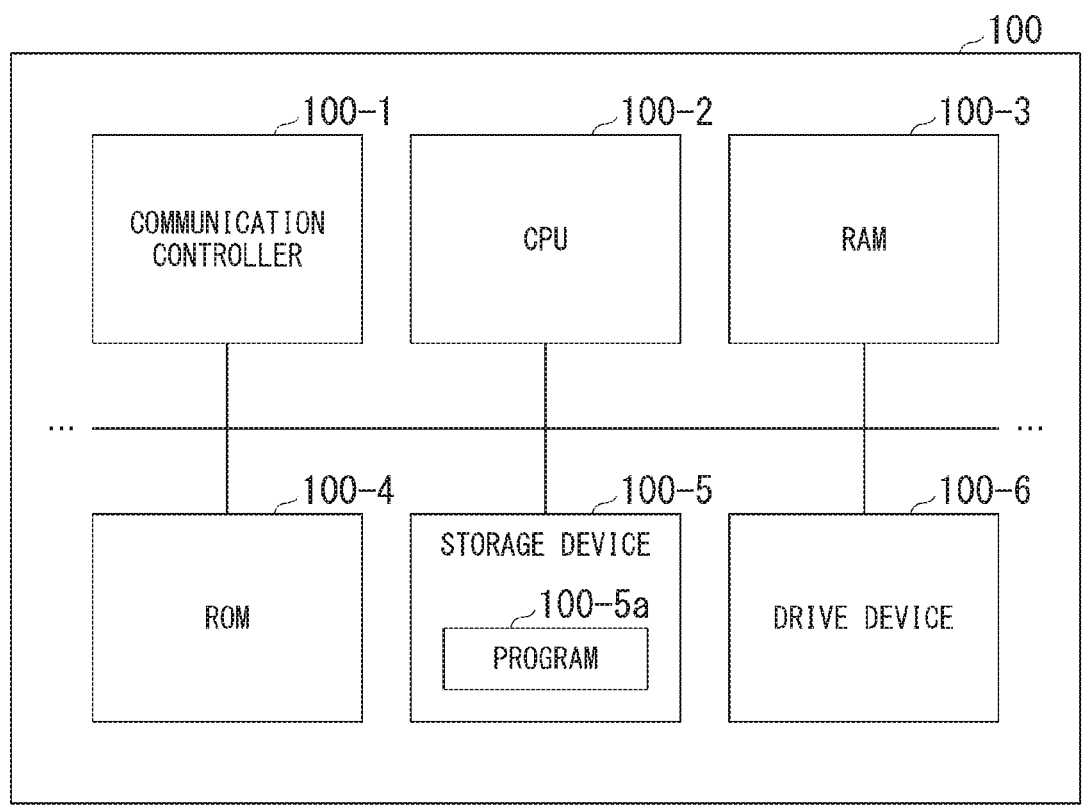
FIG. 17 is a diagram illustrating an example of a hardware constitution of an automated driving control device in the embodiment.

FIG. 17 is a diagram illustrating an example of a hardware constitution of the automated driving control device 100 in the embodiment. As shown in FIG. 17, the automated driving control device 100 is configured such that a communication controller 100-1, a CPU 100-2, a random access memory (RAM) 100-3 used as a working memory, a read only memory (ROM) 100-4 configured to store a boot program or the like, a storage device 100-5 such as a flash memory and a hard disk drive (HDD), a drive device 100-6, and the like are mutually connected through an internal bus or a dedicated communication line. The communication controller 100-1 communicates with constituent elements other than the automated driving control device 100. A program 100-5a executed by the CPU 100-2 is stored in the storage device 100-5. This program is developed in the RAM 100-3 using a direct memory access (DMA) controller (not shown) or the like and executed using the CPU 100-2. Thus, a part or all of the recognizer 130, the predictor 142, and the processor 144 are realized.

The embodiment described above can be expressed as follows:

A vehicle control device including:
a storage device which stores a program; and
a hardware processor,
wherein, when the hardware processor executes the program stored in the storage device, a state of a moving body is recognized,
a position of the moving body in the future is predicted on the basis of the recognition result, and
a determination concerning whether to set a first risk region or a second risk region larger than the first risk region for the moving body is performed on the basis of the deviation between a position of the moving body which has been recognized and a position of the moving body in the future which has been predicted previously.

Although the embodiments for carrying out the present invention have been described above using the embodiments, the present invention is not limited to the embodiments at all and various modifications and substitutions can be possible without departing from the gist of the present invention.

What is claimed is:
1. A predicting device, comprising:
a memory that stores instructions; and
one or more processors that executes the instructions to:
recognize a state of a moving body,
predict a predicted position of the moving body at a future time based on the state of the moving body;
determine whether to set a first risk region or a second risk region larger than the first risk region for the moving body based on a deviation between a recognized position of the moving body and the predicted position of the moving body, wherein the recognized position of the moving body is determined based on a position point situated above an absolute coordinate representative of a center of gravity of a vehicle in which the predicting device is installed or a center of a drive axis of the vehicle,
recognize at a first time, the recognized position of the moving body at the first time,
predict at the first time, the predicted position of the moving body at a second time, the second time being after the first time,
recognize at the second time, an actual position of the moving body at the second time,
set the first risk region for the moving body in a case in which the deviation between the predicted position of the moving body at the second time predicted at the first time and the actual position of the moving body at the second time is less than a first predetermined degree,
set the second risk region for the moving body in a case in which the deviation between the predicted position of the moving body at the second time predicted at the first time and the actual position at the second time recognized at the second time is equal to or greater than the first predetermined degree, wherein the first risk region and the second risk region are set centering on the position of the moving body or centering on the predicted position of the moving body, and
control at least one of a speed and steering of the vehicle based on the first risk region or the second risk region.

2. The predicting device according to claim 1, wherein the processor is configured to set the first risk region or the second risk region for one or both of the actual position of the moving body at a current time and the predicted position of the moving body at the future time.

3. The predicting device according to claim 2, wherein the processor is configured to set the second risk region for the moving body in which the deviation between the predicted position of the moving body at the second time and the actual position of the moving body determined at the second time as predicted at the first time before the second time is the first predetermined degree or more and which is present in a predetermined range from a reference position.

4. The predicting device according to claim 1, wherein the processor is configured to set the first risk region for the moving body when the deviation between the actual position of the moving body at the second time and the predicted position of the moving body at the second time predicted at the first time before the second time is less than the first predetermined degree, and
set the second risk region for the moving body when the deviation between the actual position of the moving body at the second time at which the moving body has been recognized and the predicted position of the moving body at the second time which has been predicted at the first time before the second time is the first predetermined degree or more.

5. The predicting device according to claim 4, wherein the processor is configured to set the first risk region for the moving body when the second risk region is set and when the deviation between the predicted position and the actual position is less than a second predetermined degree.

6. The predicting device according to claim 5, wherein the second predetermined degree is a degree smaller than the first predetermined degree.

7. The predicting device according to claim 1, wherein the processor is configured to change a processing cycle based on the deviation between the actual position of the moving body and the predicted position of the moving body at the future time.

8. The predicting device according to claim 7, wherein the processor is configured to not change the processing cycle when the deviation between the actual position of the moving body at the second time and the predicted position of the moving body at the second time which has been predicted before the second time is less than a first predetermined degree, and
change the processing cycle when the deviation between the actual position of the moving body at the second time and the predicted position of the moving body at the second time is the first predetermined degree or more.

9. The predicting device according to claim 8, wherein the processor is configured to change the processing cycle to a preceding processing cycle when the deviation between the predicted position and the actual position was less than a third predetermined degree.

10. The predicting device according to claim 9, wherein the third predetermined degree is a degree smaller than the first predetermined degree.

11. The predicting device according to claim 8, wherein the processor is configured to change the processing cycle in which the moving body is set as a target when the deviation between the actual position of the moving body at the second time and the predicted position of the moving body at the second time is a the first predetermined degree or more and the moving body is present in a predetermined range from a reference position.

12. The predicting device according to claim 1, wherein the moving body represents a pedestrian walking on a road, wherein the road comprises a roadway and a sidewalk that are not distinguished, or wherein the road comprises the roadway without the sidewalk.

13. A storage medium in which a program is stored causing a computer:
to recognize a state of a moving body,
to predict a predicted position of the moving body at a future time based on the state of the moving body; and
to determine whether to set a first risk region or a second risk region larger than the first risk region for the moving body based on a deviation between the recognized position of the moving body and the predicted position of the moving body, wherein the recognized position of the moving body is determined based on a position point situated above an absolute coordinate representative of a center of gravity of a vehicle in which the predicting device is installed or a center of a drive axis of the vehicle,
to recognize at a first time, the recognized position of the moving body at the first time,
to predict at the first time, the predicted position of the moving body at a second time, the second time being after the first time,
to recognize at the second time, an actual position of the moving body at the second time,
to set the first risk region for the moving body in a case in which the deviation between the predicted position of the moving body at the second time predicted at the first time and the actual position of the moving body at the second time is less than a first predetermined degree,
to set the second risk region for the moving body in a case in which the deviation between the predicted position of the moving body at the second time predicted at the first time and the actual position at the second time recognized at the second time is equal to or greater than the first predetermined degree, wherein the first risk region and the second risk region are set centering on the position of the moving body or centering on the predicted position of the moving body, and
to control at least one of a speed and steering of the vehicle based on the first risk region or the second risk region.

14. The predicting device according to claim 1,
wherein the one or more processors execute the instructions to:
set the second risk region for the moving body, then
predict at a third time, the predicted position of the moving body at a fourth time, the third time being after the second time and the fourth time being after the third time,
recognize at the fourth time, the actual position of the moving body at the fourth time,
set the first risk region for the moving body in a case in which the deviation between the predicted position of the moving body at the fourth time predicted at the third time and the actual position at the fourth time recognized at the fourth time is less than a second predetermined degree, and
set the second risk region for the moving body in a case in which the deviation between the predicted position of the moving body at the fourth time predicted at the third time and the actual position at the fourth time recognized at the fourth time is equal to or greater than the second predetermined degree, and
wherein a deviation degree of the second predetermined degree is smaller than a deviation degree of the first predetermined degree.

15. The predicting device according to claim 1,
wherein the one or more processors execute the instructions to:
set the first risk region for the moving body in a case in which the deviation between the predicted position of the moving body at the second time predicted at the first time and the actual position at the second time recognized at the second time is less than the first predetermined degree, further, predict at the second time the predicted position of the moving body at a third time, the third time being after the second time, recognize at the third time, the actual position of the moving body at the third time, set the first risk region for the moving body in a case in which the deviation between the predicted position of the moving body at the third time predicted at the second time and the actual position of the third time recognized at the third time is less than a threshold, set the second risk region for the moving body in a case in which the deviation between the predicted position of the moving body at the third time predicted at the second time and the actual position at the third time recognized at the third time is equal to or greater than the threshold, set the second risk region for the moving body in a case in which the deviation between the predicted position of the moving body at the second time predicted at the first time and the actual position at the second time recognized at the second time is equal to or greater than the first predetermined degree, further, predict at the second time the predicted position of the moving body at a fourth time, the fourth time being after the second time and the fourth time being before the third time, recognize at the fourth time, the actual position of the moving body at the fourth time, set the first risk region for the moving body in a case in which the deviation between the predicted position of the moving body at the fourth time predicted at the second time and the actual position at the fourth time recognized at the fourth time is less than a threshold, set the second risk region for the moving body in a case in which the deviation between the predicted position of the moving body at the fourth time predicted at the second time and the actual position at the fourth time recognized at the fourth time is equal to or greater than the threshold.

* * * * *